United States Patent [19]

Yanabu et al.

[11] 4,389,693

[45] Jun. 21, 1983

[54] LIGHTNING ARRESTER

[75] Inventors: Satoru Yanabu, Machida; Susumu Nishiwaki, Yokohama; Mizuho Yamashita, Yokohama; Toshikazu Satoh, Yokohama; Yoichi Murakami, Yokohama; Susumu Imai, Yokohama, all of Japan

[73] Assignee: Tokyo Shibaura Denki Kabushiki Kaisha, Japan

[21] Appl. No.: 335,639

[22] Filed: Dec. 30, 1981

Related U.S. Application Data

[63] Continuation of Ser. No. 116,968, Jan. 3, 1980, abandoned.

[30] Foreign Application Priority Data

Jan. 31, 1979 [JP] Japan .................................. 54-9128

[51] Int. Cl.³ ............................................. H02H 9/04

[52] U.S. Cl. .................................... 361/127; 361/126

[58] Field of Search ................ 361/127, 126, 117, 56, 361/128; 313/231.1, 325; 315/36

[56] References Cited

U.S. PATENT DOCUMENTS 3,320,482 5/1967 Sakshaug et al. .............. 361/128 X 4,072,998 2/1978 Schei .............................. 361/128 X 4,174,530 11/1979 Kresge et al. ...................... 361/127

FOREIGN PATENT DOCUMENTS 1003485 1/1977 Canada .............................. 361/127

54-144945 12/1979 Japan .................................. 361/127

OTHER PUBLICATIONS

Preprints of Papers for Symposium in Joint Conference on Zinc Oxide Varistor, Sep. 26–27, 1978, Japan, Papers No. 6–15, Matsushita Electric Industrial Co. Ltd.

*Primary Examiner*—Patrick R. Salce

*Attorney, Agent, or Firm*—Finnegan, Henderson, Farabow, Garrett & Dunner

[57] ABSTRACT

An arrester having at least two stacks of non-linear resistors connected in series, an arcing gap device connected to shunt one stack of resistors when the gap means sparks over, and a hermetically sealed housing enclosing the resistor stacks and arcing gap device and filled with sulfur hexafluoride gas having a gauge pressure not less than 2 kg/cm². The impedance of the one resistor stack is from about 15% to about 35% of the total impedance of the two resistor stacks when the arcing gap means sparks over, and the rated voltage of the arrester is not less than about 50 KV.

4 Claims, 3 Drawing Figures

Fig. 1
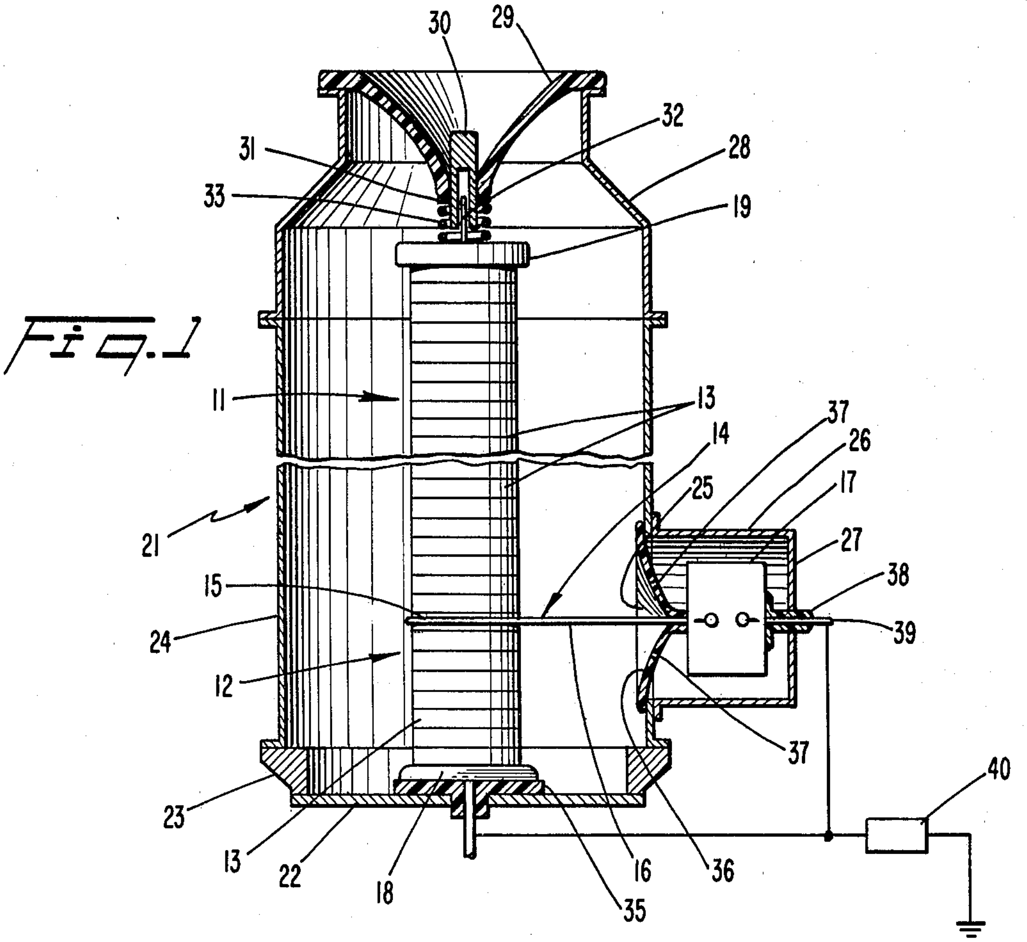
Fig. 2
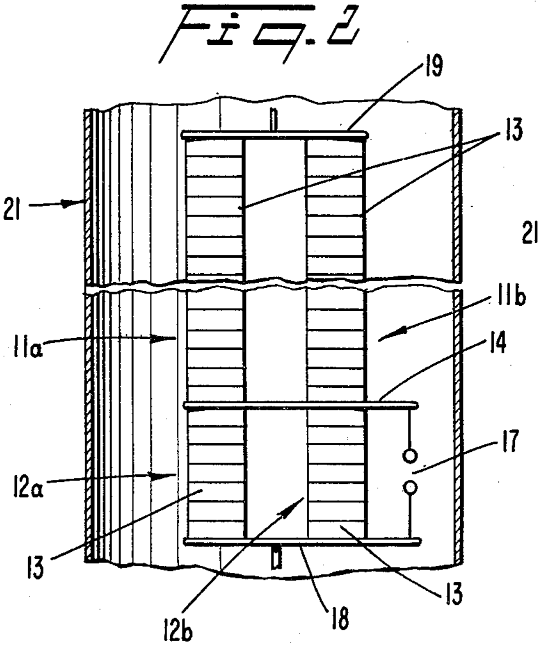
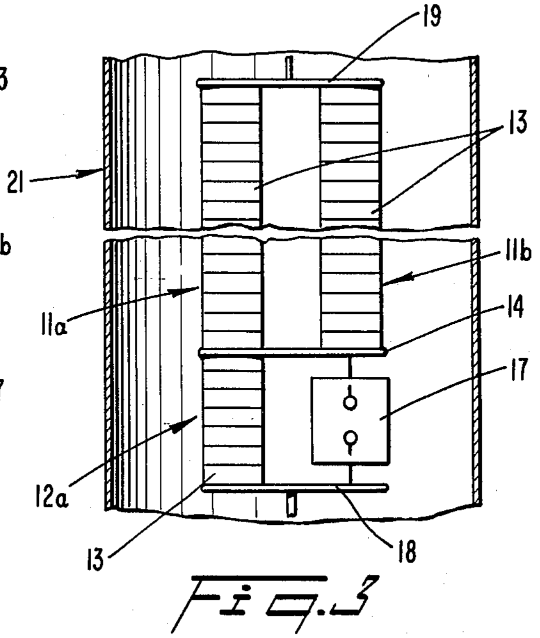
Fig. 3

LIGHTNING ARRESTER

This is a continuation of application Ser. No. 6/116,968, filed Jan. 3, 1980, now abandoned.

BACKGROUND OF THE INVENTION

This invention relates to lightning surge arresters, and more particularly to improvements in such arresters which include non-linear resistors constructed of metal oxide, for example, zinc-oxide.

Lightning arresters are protective devices used to limit surge voltages in equipment caused by lightning or other disturbances in the equipment circuit. Lightning arresters generally function to bypass or discharge surge current and discharge surge voltages within a fraction of a cycle and prevent damage to the protected equipment.

Many prior lightning arresters use non-linear resistors which are isolated from the line voltage by spark gaps in series with the resistors. The gaps prevent current flow to the resistors under normal conditions. However, when a surge occurs in the line, "spark-over" or "arcing" occurs across the gap and the surge voltage and surge current are discharged. The gap dimension establishes the surge voltage at which arcing occurs.

One of the problems which arises in using arresters having arcing gaps in series with non-linear resistors is that contamination can trigger repetitive spark-over which causes the arrester to overheat. Also, arresters having arcing gaps in series with the non-linear resistors have an inherent time lag before arcing occurs. At surge conditions, this means that the voltage can rise to a dangerous level before it is discharged.

Non-linear resistors having very good non-linear characteristics have recently been developed. These include resistors constructed of zinc oxide, and, because of their excellent non-linearity, they make it possible to eliminate arcing gaps in series with the resistors in the arresters. By eliminating the series gaps, there is no time lag before the arrester goes into conduction and the surge voltage is kept to a low level. Also, contamination does not have the undesirable effect it does in arresters having series gaps.

Although it is desirable to eliminate series gaps in arresters, it may be desirable to employ an arcing gap device in parallel with a portion of the zinc oxide resistors. Such an arrangement shunts a portion of the zinc oxide resistors and improves the level of protection provided by the arrester. The arcing level of such parallel gaps must be above the normal operating voltage but below the arrester voltage when the protective voltage level is reached.

Many prior arresters using non-linear resistors, including those of zinc oxide, and a parallel arcing gap device are designed to have a prescribed rated voltage, i.e., 14 KV. If an installation requires a higher voltage rating, two or more arrester units can be connected together. The arresters include an outer housing enclosing the zinc oxide resistors and the parallel gap device, and can contain nitrogen or other gas, or they can be sealed and the air evacuated.

The arrester housing is desirably constructed of metal which can be grounded so that the arrestor can be placed as closely as possible to the equipment to be protected. In such cases, the zinc oxide resistors must be insulated from the metal housing. To achieve this required insulation effect but with minimal space between the resistors and metal housing and therefore minimal overall arrester size, it has been proposed to fill the housing with sulfur hexafluoride gas ($SF_6$) because of its excellent electrical insulating qualities. This is particularly advantageous in arrestors used in miniaturized electric substations, metal clad switch gears, and the like, where overall size of the arrester is critical.

It will be appreciated that when sulfur hexafluoride gas is used in the arrestor housing, its excellent insulation characteristics also requires that the dimension of the parallel arcing gap be reduced. However, it is necessary that the parallel gap device be stable in operation and that spark-over occur at the desired predetermined voltage. If the arcing gap becomes too small, stability is difficult to maintain.

SUMMARY OF THE INVENTION

Accordingly it is an object of this invention to provide a lightning arrester which obviates the need for arcing or spark-over gaps in series with the arrester, which is small and compact and can be installed close to the equipment to be protected, and which is stable and reliable in performance.

According to one aspect of this invention, the lightning arrester comprises at least two stacks of non-linear resistors constructed of a metal oxide and connected in series, arcing gap means connected in parallel to one of said stacks of resistors and operable to shunt said one stack of resistors when the gap means sparks over, and a hermetically sealed housing enclosing said stacks of resistors and said arcing gap means and filled with sulfur hexafluoride gas at a gauge pressure not less than 2 $kg/cm^2$, the impedance of the one stack of resistors being from about 15 to about 35% of the total impedance of the two stacks of resistors when the gap means sparks over, and the rated voltage of the arrester being not less than about 50 KV.

BRIEF DESCRIPTION OF THE DRAWINGS

FIG. 1 is a schematic cross-sectional view of a preferred embodiment of this invention;

FIG. 2 is a schematic cross-sectional view similar to a portion of FIG. 1 and showing another embodiment of this invention; and FIG. 3 is a schematic cross-sectional view similar to FIG. 2 and showing still another embodiment of this invention.

DETAILED DESCRIPTION OF THE PREFERRED EMBODIMENT

Referring now to FIG. 1, a lightning arrester constructed in accordance with the invention is seen to include two stacks of non-linear resistors 11, 12 each comprising a plurality of non-linear resistor elements 13 of disc shape stacked one upon another. The non-linear resistor discs 13 are constructed of metal oxide, preferably zine oxide, and each of the resistor discs 13 have the same voltage rating.

The number of resistor discs 13 in stack 12 compared to the total number of resistor discs 13 in both stacks 11 and 12 may vary according to the desired characteristics of the arrester. It is noted, however, that in accordance with the invention, the number of discs 13 in stack 12 and, correspondingly, the impedance of stack 12, should be within the range of from about 15% to about 35% of total number of discs in and the total impedance of both stacks 11 and 12. The reasons for this are described below.

A connecting member 14 of electrically conductive material such as copper has a disc-like portion 15 sandwiched between the stacks of resistors 11 and 12 and a conductive bar 16 extending from portion 15. An arcing gap device 17 is connected to the conductive bar 16 and is operable to shunt the resistor stack 12 when the gap sparks over.

The arrester components including resistor stacks 11, 12 and spark-over gap device 17, are enclosed in an airtight or hermetically sealed housing generally indicated at 21. The housing 21 has a disc-like metal base 22, a ring-like metal support 23, and a main cylindrical metal portion 24. An opening 25 is formed in the cylindrical portion 24 and is surrounded by a cylindrical metal casing 26 having an end wall 27. The cylindrical member 26 closes the opening 25 and houses the arcing gap device 17 and forms part of the housing 21. The housing 21 also has an upper, generally cylindrical, metal portion 28. A conical support member 29 constructed of insulating material is mounted on top of the metal portion 28.

A high voltage terminal 30 having a flange 31 is adapted to be connected to a line to be protected (not shown) and extends though a central opening in the conical support member 29 from inside to outside the housing 21 so that the flange 31 abuts an edge of the central opening in the support member 29. The high voltage terminal 30 has a recess for receiving a guide 32 projecting upwardly from a shield ring 19 which is provided on top of resistor stack 11. A compression spring 33 is positioned between the flange 31 and the shield ring 19. Electrical connection between the high tension terminal 30 and the shield ring or high voltage electrode 19 is made through the spring 33. A tape of highly electrically conductive material can be wound around the wire which forms the spring 33, if desired.

A ground potential base electrode 18 is provided at the bottom of resistor stack 12 and is supported on the metal base 22 of the casing 21 through an insulating member 35. The insulating member 35 has a bored projection extending through a central opening in the base 22. A ground terminal 36 extends from the ground electrode 18 and through a bore in the cylindrical projection of the insulation member 35.

In order to support the conductive bar 16 of the connecting member 14 and the arcing gap device 17, there is provided a generally conical insulating support 36 which is connected to the cylindrical housing portion 24 and to the bar 16 and gap device 17. The support 36 has openings 37 which communicate the chamber surrounding the resistor disc stacks 11 and 12, and the chamber in the casing 26 which contains the arcing gap device 17. The gap device 17 is also supported by an insulating member 38 which has a projection extending through an opening in the end wall 27 of the casing 26. A conductive bar 39 extends through the insulating support member 38 and connects one arcing electrode of the gap device 17 to ground. The other arcing electrode of the gap device 17 is electrically connected to the bar 16 of connecting member 14.

The base electrode 18 and the conductive bar 39 are connected and then grounded, as shown. A device 40 may be provided to count the number of times the arrester is actuated. Desirably, the metal portion of the housing 21 and casing 26 is also grounded by suitable means (not shown).

The chamber formed by housing 21 which contains the stacks 11, 12 of resistor discs, and the chamber formed by casing 26 which contains the gap device 17, are hermetically sealed although the two chambers are mutually communicated through openings 37 formed in support member 36. The housing 21 and casing 26 are filled with sulfur hexafluoride ($SF_6$) gas having gauge pressure not less than 2 kg/cm$^2$. It is noted that if the gauge pressure of the sulfur hexafluoride gas is lower than 2 kg/cm$^2$ the insulation characteristics of the gas is not utilized effectively. In that case, more space would be required between the resistor stacks 11, 12 and the metal housing portion 24 for insulation purposes and this contributes significantly to the overall size of the arrester.

In operation, surge voltage applied to the high voltage terminal 30 causes the resistor disc stacks 11 and 12 to reduce their impedances to flow surge current therethrough according to the characteristics of the resistor discs 13. Voltage at the terminal 30 increases and, at the same time, the voltage applied to the spark-over gap device 17 also increases until it reaches its arcing or spark-over voltage. The resistor disc stack 12 is then shunted by arcing. This increases the protective level of the arrester. When voltage at the terminal 30 reduces to a predetermined level, the arcing gap device 17 interrupts arcing current.

Assume now that rating of the arrester is 50 KV, and that the impedance of the resistor stack 12 is 15% of the total impedance of stacks 11 and 12. The rating of the parallel arcing gap device 17 is $50\times0.15=7.5$ KV.

Assume further that the ratio of spark-over voltage to the rated voltage of the gap device 17 is 2 (i.e., spark-over voltage/rating voltage=2) which is conventional. Then the spark-over voltage of gap device 17 is $7.5\times2=15$ KV. With these values and when employing sulfur hexafluoride gas at a gauge pressure of at least 2 kg/cm$^2$, the required distance between arcing electrodes in the gap device 17 is about 0.8 mm. It should be noted that a distance of about 0.8 mm between arcing electrodes is the minimum value to obtain stable spark-over and interrupting characteristics in an arcing device.

Applying the same calculations to arresters having a rating of 14 KV, it is seen that the rating of the arcing gap would be $14\times0.15=2.1$ KV, and the spark-over voltage would be 4.2 KV. The required distance between arcing electrodes having a spark-over voltage of 4.2 KV is about 1 mm when the enclosing housing is filled with nitrogen. However, if sulfur hexafluoride gas at a gauge pressure of about 2 kg/cm$^2$ is used, the distance between the arcing electrodes is reduced to about 0.2 mm. It will be appreciated that reliable spark-over and interruption performance is nearly impossible to achieve when the electrodes are that close.

Therefore, according to this invention, the rated voltage of the arrester is not less than about 50 KV, and the impedance of the shunted resistor stack 12 is not less than 15% of the total impedance of the resistor stacks 11 and 12 at the time when the arcing gap device 17 sparks over. Thus, a minimum distance between the arcing electrodes required for reliable performance, i.e., 0.8 mm, can be used.

If the percentage of total impedance of resistor stacks 11, 12 represented by the shunted resistor stack 12 is increased, it requires that the distance between the arcing electrodes also be increased because the spark-over voltage required becomes higher. However, an arcing gap having spark-over voltage more than about 35 KV tends to be unreliable because the spark-over voltage becomes too unstable. In an arrester having a rating of 50 KV, a spark-over voltage of about 35 KV is required when the impedance of the shunted resistor stack 12 represents about 35% of the total impedance of both stacks 11 and 12. Thus, if the rated voltage of the arrester is 50 KV, the rating of the parallel gap device is $50\times0.35=17.5$ KV, and the spark-over voltage to the rated voltage ratio of the gap device 17 is 2, then the spark-over voltage is $17.5\times2=35$ KV.

Accordingly, it is preferred that the parallel arcing device 17 is connected to shunt from about 15% to about 35% of the total resistor disc stacks 11 and 12.

It is also understood that the gauge pressure of the sulfur hexafluoride ($SF_6$) gas should not be less than 2 kg/cm$^2$ in order to utilize the insulation and interrupting characteristics of this gas. The sulfur hexafluoride gas also contributes to the interruption of the arc between the electrodes of the gap device 17 when the surge voltage drops off.

In FIGS. 2 and 3, which show other embodiments of this invention, similar or identical parts are indicated by the same reference numerals used in FIG. 1. In FIG. 2, two parallel sets of resistor disc stacks, both having the same ratings, are provided to increase the current capacity of the arrester. One set of resistor stacks are shown at 11*a* and 12*a* and correspond to stacks 11 and 12 in FIG. 1. The other set of stacks 11*b* and 12*b* also correspond to the arrangements 11 and 12 in FIG. 1. The stacks 11*a* and 11*b* are connected in parallel by a modified shield ring 19 and connecting member 14. Stacks 12*a* and 12*b* are also connected in parallel by the modified connecting member 14 and base electrode 18. The parallel arcing gap device 17 is connected to stacks 12*a* and 12*b* to shunt them when the gap device 17 sparks over.

In FIG. 3, stack 12*b* in FIG. 2 is omitted and gap device 17 substituted therefor for a simpler construction. After the gap device 17 sparks over, no current flows through stack 12*a* which carries current for a relatively short time interval when compared with the time interval during which current flows in stacks 11*a* and 11*b*. The current capacity required in the shunted stack is somewhat smaller than in stacks 11*a* and 11*b*. Thus the simpler arrester construction of FIG. 3 can be used.

Although preferred embodiments are illustrated and described herein, this invention is not limited to these embodiments. It is to be understood that, within the spirit of this invention, there may be many modifications and changes. For example, still another parallel set of resistor disc stacks may be added to the embodiment of FIG. 2.

What is claimed is:

1. A lightning arrester comprising:

at least two stacks of non-linear resistors, each including a plurality of non-linear elements constructed of a metal oxide, and connected in series;

arcing gap means connected in parallel to one of said stacks and operable to shunt said one stack of resistors to ground, said arcing gap means including electrodes which are spaced apart a distance not less than about 0.8 mm;

a hermetically sealed housing enclosing said stacks of resistors and said arcing gap means and filled with sulfur hexafluoride gas at a gauge pressure not less than 2 kg/cm$^2$;

the impedance of said one stack of resistors being between about 15 to about 35% of the total impedance of the two stacks of resistors when said arcing gap means sparks over; and the rated voltage of the arrester being not less than about 50 KV.

2. An arrester according to claim 1, wherein said non-linear resistor elements are constructed of zinc oxide.

3. An arrester according to claim 1 or 2, which further includes two additional stacks of non-linear resistors having ratings the same as said first mentioned resistor stacks and connected in parallel therewith.

4. An arrester according to claim 1 or 2, which further includes an additional stack of non-linear resistors connected in parallel with and having the same rating as the non-shunted stack.

* * * * *